United States Patent
Ghiasi

(10) Patent No.: US 9,143,464 B2
(45) Date of Patent: Sep. 22, 2015

(54) METHOD AND SYSTEM FOR SPEED NEGOTIATION FOR TWISTED PAIR LINKS USING INTELLIGENT E-FIFO IN FIBRE CHANNEL SYSTEMS

(71) Applicant: Broadcom Corporation, Irvine, CA (US)

(72) Inventor: Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/668,517

(22) Filed: Nov. 5, 2012

(65) Prior Publication Data

US 2013/0058363 A1  Mar. 7, 2013

Related U.S. Application Data

(63) Continuation of application No. 11/491,628, filed on Jul. 24, 2006, now Pat. No. 8,306,070.

(60) Provisional application No. 60/742,196, filed on Dec. 2, 2005.

(51) Int. Cl.
*H04L 12/931* (2013.01)
*H04L 12/935* (2013.01)

(52) U.S. Cl.
CPC .......... *H04L 49/357* (2013.01); *H04L 49/3054* (2013.01)

(58) Field of Classification Search
CPC ........................ H04L 49/357; H04L 49/3054
See application file for complete search history.

(56) References Cited

U.S. PATENT DOCUMENTS

| | | | |
|---|---|---|---|
| 5,953,345 A * | 9/1999 | Findlater et al. | 370/446 |
| 6,529,971 B1 * | 3/2003 | Thiesfeld | 710/53 |
| 6,978,344 B2 | 12/2005 | Schauer | |
| 2002/0041571 A1 * | 4/2002 | Huff | 370/252 |
| 2003/0016770 A1 | 1/2003 | Trans et al. | |
| 2003/0108061 A1 * | 6/2003 | Black et al. | 370/447 |
| 2004/0030805 A1 | 2/2004 | Fujimori et al. | |
| 2004/0030968 A1 | 2/2004 | Fan et al. | |
| 2004/0116151 A1 * | 6/2004 | Bosch et al. | 455/550.1 |
| 2005/0131987 A1 | 6/2005 | Chen et al. | |
| 2006/0050726 A1 * | 3/2006 | Ahmed et al. | 370/437 |
| 2006/0245453 A1 | 11/2006 | Bedrosian | |
| 2007/0011536 A1 * | 1/2007 | Khanna et al. | 714/733 |

* cited by examiner

*Primary Examiner* — Jae Y Lee
(74) *Attorney, Agent, or Firm* — Oblon, McClelland, Maier & Neustadt, L.L.P.

(57) ABSTRACT

Systems, apparatuses and methods are disclosed for using elastic buffers in fiber channel systems over twisted pair links. One such system includes a fiber channel host device and another fiber channel host device communicatively coupled to the fiber channel device over a twisted pair link. The system also includes a slave physical layer (PHY) circuit residing in the fiber channel host device and a master PHY circuit residing in the another fiber channel host device. The master PHY circuit is operable to transmit, using a reference clock, data from a transmit elastic buffer. The slave PHY circuit is operable to receive the data transmitted by the master PHY circuit and to store the received data using a derived clock recovered from the received data.

15 Claims, 5 Drawing Sheets

METHOD AND SYSTEM FOR SPEED NEGOTIATION FOR TWISTED PAIR LINKS USING INTELLIGENT E-FIFO IN FIBRE CHANNEL SYSTEMS

CROSS-REFERENCE TO RELATED APPLICATIONS/INCORPORATION BY REFERENCE

This application is a continuation of U.S. application Ser. No. 11/491,628, filed Jul. 24, 2006 and makes reference to, claims priority to, and claims the benefit of U.S. Provisional Patent Application Ser. No. 60/742,196 filed Dec. 2, 2005. Each of these applications is hereby incorporated herein by reference in its entirety.

FIELD OF THE INVENTION

Certain embodiments of the invention relate to fibre channel systems. More specifically, certain embodiments of the invention relate to a method and system for speed negotiation for twisted pair links using intelligent elastic first-in-first-out (E-FIFO) in fibre channel systems.

BACKGROUND OF THE INVENTION

Fibre channel, a new interconnect technology for high-performance computer peripherals and networks, has a number of advantages over similar technologies. Fibre channel enables channel data transfer speeds about two and half times faster than high-end small computer system interface (SCSI) and carries network and channel traffic over the same lines with equal efficiency. Fibre channel can also carry audio and video data, supports a range of transmission media and distances, is very reliable, scalable, and easy to integrate into existing systems.

Fibre channel is a communications protocol that enables transmission of data at speeds from approximately 1.0625 Gbps up through 8.5 Gbps. Historically, Fibre channel has operated over optical fibre cables, coaxial or twin-axial copper cabling, or as a chip-to-chip interface within a board. In conventional fibre channel systems, electrical media was used to communicate fibre channel signals. High speed fiber optic systems may be used in various communication applications, for instance in telecommunication over long transmission distances. A telecommunication network may be classified into various levels such as subscriber networks, regional networks and national networks. The national networks, for example, may exist between different cities where there is a greater demand for higher transmission speeds, for example, above 5 Gbits/sec. In national networks, for example, dispersion may limit the transmission speeds between transmitters and receivers. Optical dispersion is a fundamental problem for high-speed gigabit networks and is of particular importance as bit rates exceed 2.4 Gbits/sec, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for speed negotiation for twisted pair links using intelligent elastic first-in-first-out (E-FIFO) in fibre channel systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for speed negotiation for twisted pair links using intelligent elastic first-in-first-out (E-FIFO) in fibre channel systems. Certain aspects of the invention may provide a method and system for determination of a priority level based on amount of data in at least one elastic FIFO (E-FIFO) buffer communicatively coupled to at least one of the fibre channel host devices. The E-FIFO buffer may be modified either by insertion or deletion of IDLE words or words from an order set based on the determined priority level. The data may be synchronously communicated between fibre channel host devices communicatively coupled via the twisted pair link based on the modified elastic buffer.

In contrast to fibre channel, Ethernet has historically supported communication over twisted pair cable at lengths up to about 100 meters. A typical configuration of the cable is four twisted pairs, in various performance levels, for example, category 5, category 5e, or category 6. Various physical layer solutions have applied sophisticated signal processing algorithms to make use of the channel capacity of the twisted pair cable. Twisted pair cable offers several distinct advantages over the cables historically supported by fibre channel. These include low cost, ease of termination, and availability of field termination.

Both fibre channel and Ethernet have algorithms to allow the two nodes on each end of a cable to negotiate between the various speeds to determine the best speed for operation. However, the algorithms used in fibre channel are not directly applicable to many physical architectures that are suitable for operation over twisted pair. In an embodiment of the invention, a new speed negotiation algorithm for fibre channel nodes operating over twisted pair cables is provided. Fibre channel and Ethernet TP PHY require a suitable method of speed matching two nodes by either utilizing an E-FIFO or over clocking the link. Conventional speed matching may add significant complexity. In an embodiment of the invention, a scheme based on an intelligent E-FIFO may be utilized that is compatible with FC framing and order sets.

Figure 1:
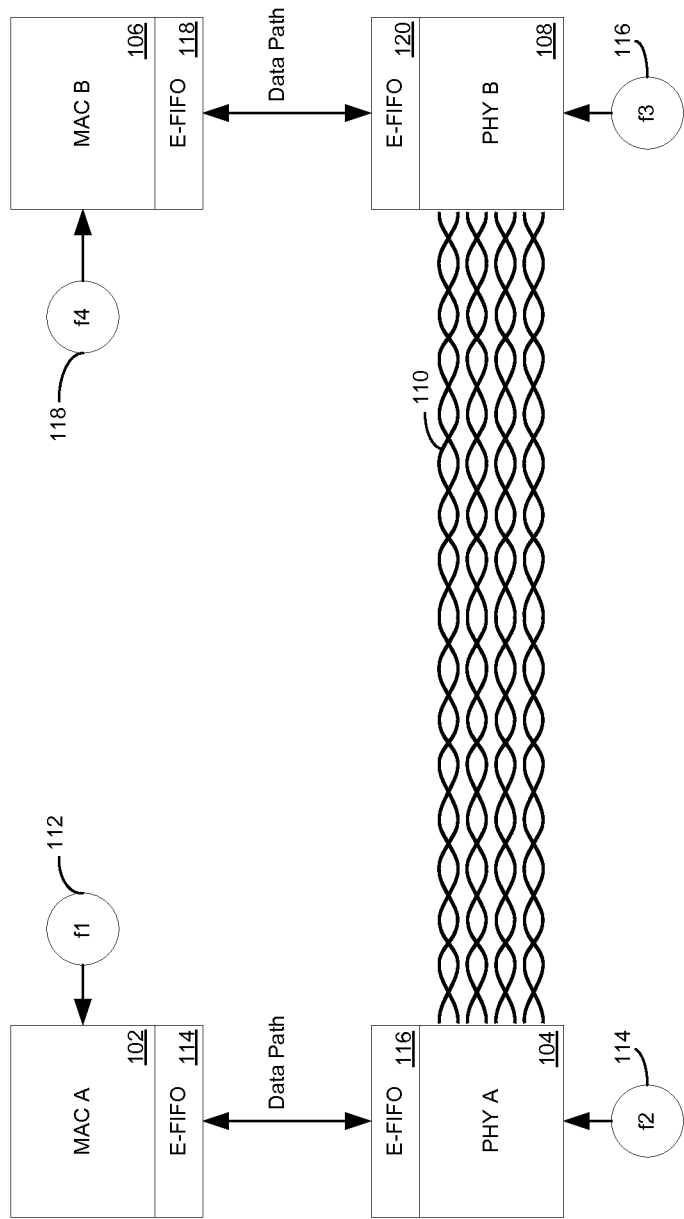
FIG. 1 is a block diagram of an exemplary Ethernet system, which may be utilized in connection with an embodiment of the invention.

FIG. 1 is a block diagram of an exemplary Ethernet system, which may be utilized in connection with an embodiment of the invention. Referring to FIG. 1, there is shown a medium access control (MAC) layer block for node A 102, a physical (PHY) layer block for node A 104, a MAC layer block for node B 106, a PHY layer block for node B 108, a plurality of E-FIFO buffers 114, 116, 118, and 120, a plurality of clocks f1 112, f2 114, f3 116, and f4 118, and a twisted pair cable 110.

The MAC layers 102 and 106 may comprise suitable logic, circuitry and/or code that may enable encoding and decoding of data packets into bits. The MAC layers 102 and 106 may comprise a MAC address that is unique to each network interface controller (NIC). The MAC layers 102 and 106 may enable furnishing of transmission protocol knowledge and may handle errors in the physical layer, flow control and frame synchronization. The MAC layers 102 and 106 may control how a computer on the network gains access to the data. The physical layer (PHY) A 104 and the PHY layer B 108 may enable transmission of information over a physical medium connecting two devices. The PHY layers 104 and 108 may transmit a bit stream, for example, an electrical impulse, light or radio signal through the network at the electrical and mechanical level. The PHY layers 104 and 108 provide the hardware for sending and receiving data on a carrier, for example, twisted pair cables 110.

In an Ethernet system utilizing twisted pair cables, speed matching may be achieved through the IEEE 802.3 auto-negotiation (AN) mechanism. In an Ethernet system with two nodes A and B, each node has a MAC layer 102 and 106, which communicates with a corresponding PHY layer 104 and 108 respectively. The PHY layers A and B, 104 and 108 respectively, communicate with each other over the twisted pair cable 110. There is a data path between the MAC layer and the PHY layer, for example, between MAC layer A 102 and PHY layer A 104 for communicating Ethernet data packets.

In an Ethernet system based on twisted pair (TP), speed matching may be achieved by insertion and deletion of Ethernet IDLE signals. In an Ethernet link, the IDLE words may be a part of an inter-packet gap (IPG), which are always present between Ethernet frames. The MAC A 102 may operate with a reference clock f1, PHY A 104 may operate with a reference clock f2, PHY B 108 may operate with a reference clock f3, and MAC B 106 may operate with a reference clock f4. The plurality of clocks f1 112, f2 114, f3 116, and f4 118 may operate within +/−100 ppm. The PHY layer A 104 and PHY layer B 108 may each have an E-FIFO 116 and 120 respectively to match their inbound and outbound data flow by insertion and deletion of IDLE words.

During data transmission, the two PHY layers 104 and 108 at the end of each twisted pair cable 110 always operate at the same speed. For higher speed Ethernet technology at 1 Gbps or more, for example, 1000 BASE-T, or 10 GBASE-T, both the PHY layers 104 and 108 on both ends of the cable 110 operate at the same frequency controlled by the clock 112. The data is transmitted and received in both directions on all four pairs simultaneously, and each PHY layer, 104 or 108, has to cancel its transmitted signal while receiving data. Therefore, the transmit and receive functions are tightly coupled, and operate together synchronously. Accordingly, the two PHY layers, 104 and 108 have to establish a common speed before any high speed data transmission may occur.

The common speed between the two PHY layers, 104 and 108 may be negotiated when communication is first initiated between the two. Each MAC layer, 102 and 106 may determine the capabilities of its corresponding PHY layer, 104 and 108 respectively, by polling the PHY layer. Each MAC layer, 102 and 106 may decide on a particular available speed to operate based on higher-level system considerations. Each MAC layer, 102 and 106 may direct, the corresponding PHY layer, 104 and 108, respectively, the particular speed it might utilize to transmit data. The PHY layers, 104 and 108 may exchange their respective speeds through a low speed communications protocol known as fast link pulses. Each PHY layer, 104 and 108, may compare its own speed to that of its link partner, and selects the highest common speed. The PHY layers, 104 and 108 may establish a data communication link at this highest common speed, and begin transmitting IDLE signals. Each PHY layer, 104 and 108 may communicate the results of negotiation to its corresponding MAC layer, 102 and 106 respectively. Each MAC layer, 102 and 106 may then begin transmitting packets as needed at the negotiated speed.

The Ethernet MAC needs to wait until negotiation is complete before transmitting data at full speed. The 802.3 negotiation process may take several seconds, which is very long compared with most events in high-speed communications systems like Ethernet or fibre channel. Furthermore, this negotiation process also requires that the two PHY layers, 104 and 108 each fully complete the negotiation process before beginning transmission of either data or IDLE words at the final operating speed.

Figure 2:
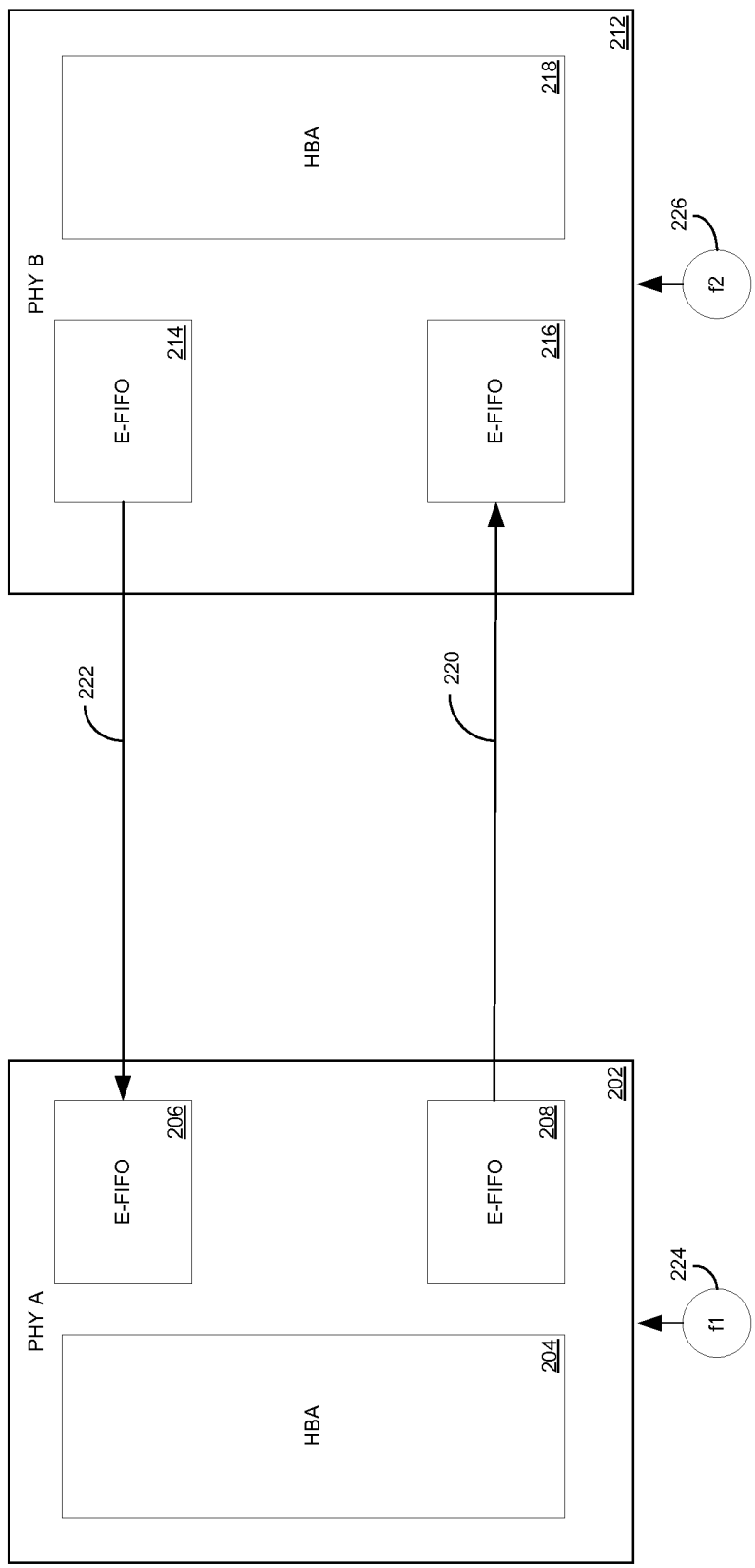
FIG. 2 is a block diagram of an exemplary fibre channel system, which may be utilized in connection with an embodiment of the invention.

FIG. 2 is a block diagram of an exemplary fibre channel system, which may be utilized in connection with an embodiment of the invention. Referring to FIG. 2, there is shown a PHY layer A 202, a PHY layer B 212, transmit path of an optical fibre cable 220, a receive path of an optical fibre cable 222, and a plurality of clocks f1 224 and f2 226. The PHY layer A 202 comprises a host bus adapter (HBA) 204, and a plurality of E-FIFO buffers 206 and 208. The PHY layer B 212 comprises a HBA 218, and a plurality of E-FIFO buffers 214 and 216.

The physical layer (PHY) A 204 and the PHY layer B 212 may enable transmission of information over a physical medium connecting two devices. The PHY layers 204 and 212 may transmit a bit stream, for example, an electrical impulse, light or radio signal through the network at the electrical and mechanical level. The PHY layers 204 and 212 provide the hardware for sending and receiving data over a medium, for example, optical fibre cables 220 and 222. The HBA 204 and 218 may comprise suitable logic, circuitry and/or code that may enable controlling access to a medium that may be shared between two or more entities also known as a data link layer or FC-2 layer. The HBA 204 and 218 may enable processing and physical connectivity between a server and a storage device. The HBA 204 and 218 may relieve a host microprocessor of both data storage and retrieval tasks, and may improve the server's performance time. In a fibre channel system, the transmit path may operate with a frequency f1 224 and the receive path may operate with a frequency f2 226. The transmit and receive paths may operate asynchronously with different frequencies.

Figure 3:
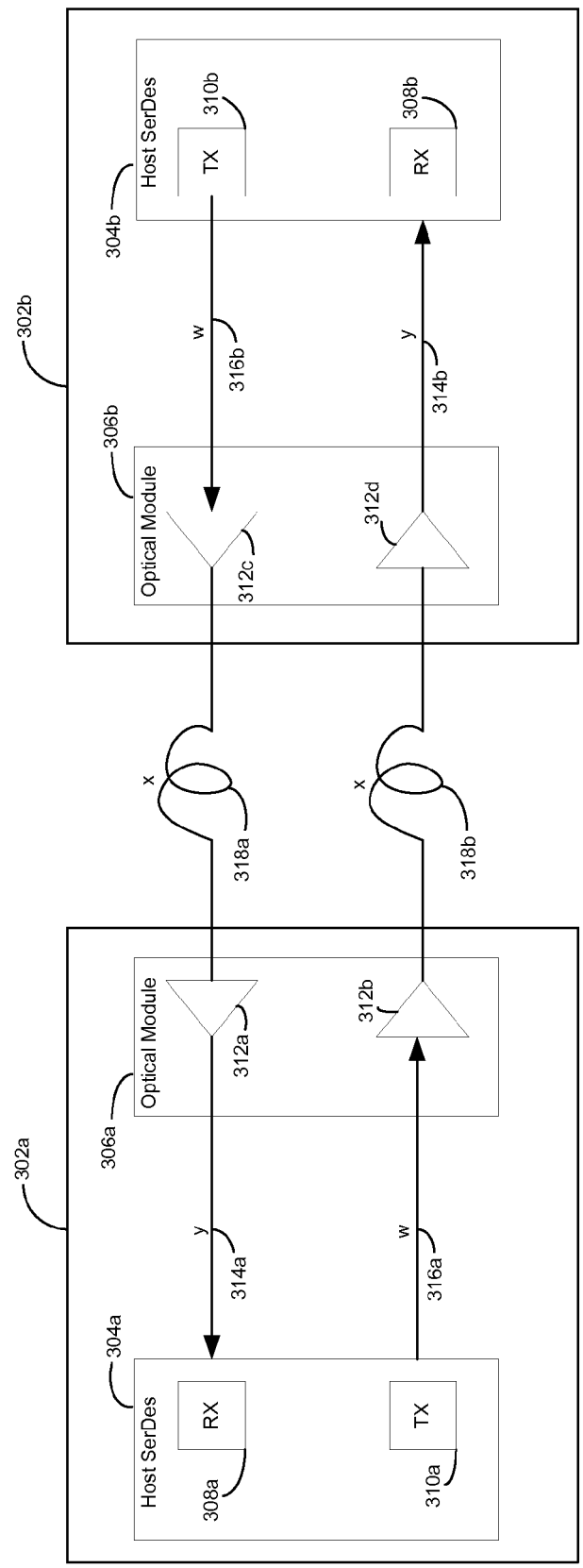
FIG. 3 is a block diagram illustrating electrical channel equalization in an optical communication circuit, in accordance with an embodiment of the invention.

FIG. 3 is a block diagram illustrating electrical channel equalization in an optical communication circuit, in accordance with an embodiment of the invention. Referring to FIG. 3, there is shown a plurality of host boards 302a and 302b, a forward optical path x 318a and a reverse optical path x 318b. The host board 302a comprises a host serializer-deserializer (SerDes) 304a, an optical module 306a, a forward electrical transmit path w 316a and a reverse electrical receive path y 314a. The host board 302 may be coated with a trace material, for example, 8"-12" FR4 trace material. The host SerDes 304a comprises a receiver RX 308a and a transmitter TX 310a. The optical module 306a comprises a plurality of optical amplifiers 312a and 312b. The host board 302b comprises a host SerDes 304b, an optical module 306b, a reverse electrical transmit path w 316b and a forward electrical receive path y 314b. The host SerDes 304b comprises a receiver RX 308b and a transmitter TX 310b. The optical module 306a comprises a plurality of optical amplifiers 312c and 312d.

The forward optical communication link comprises the transmitter TX 310a in the host SerDes 304a, the forward electrical transmit path w 316a, the optical amplifier 312b in the optical module 306a, the forward optical path x 318b, the optical amplifier 312d in the optical module 306b, the forward electrical receive path y 314b and the receiver RX 308b in the host SerDes 304b. The plurality of optical modules 306a and 306b may be either fixed or pluggable modules. When the optical module 306a or 306b is inserted, a nonlinear element may be introduced in the link. The nonlinear element may not be compensated for by using only a receive equalizer. The link may be divided into three segments. For example, the transmit electrical channel may comprise the transmitter TX 310a in the host SerDes 304a and the forward electrical transmit path w 316a. The optical channel may comprise the optical amplifier 312b in the optical module 306a, the forward optical path x 318b and the optical amplifier 312d in the optical module 306b. The receive electrical channel may comprise the forward electrical receive path y 314b and the receiver RX 308b in the host SerDes 304b. The transmitter TX 310a in the host SerDes 304a and the transmitter TX 310b in the host SerDes 304b may enable compensation for dispersion loss by pre-emphasis. The receiver RX 308a in the host SerDes 304a and the receiver RX 308b in the host SerDes 304b may enable compensation for dispersion loss by equalization. The reverse optical communication link comprises the transmitter TX 310b in the host SerDes 304b, the reverse electrical transmit path w 316b, the optical amplifier 312c in the optical module 306b, the reverse optical path x 318a, the optical amplifier 312a in the optical module 306a, the reverse electrical receive path y 314a and the receiver RX 308a in the host SerDes 304a.

The host SerDes 304a and/or 304b may enable calculation of the applied pre-emphasis by categorizing the dispersion loss along at least one of the first electrical path, for example, the forward electrical transmit path w 316a and the first optical path, for example, the forward optical path x 318b. The host SerDes 304a may enable optimization of the applied pre-emphasis by looping back the first electrical path, for example, the forward electrical transmit path w 316a through the optical module 306a. The first electrical path, for example, the forward electrical transmit path w 316a may be looped back to the host SerDes 304a via the reverse electrical receive path y 314a, if the dispersion loss along the first electrical path, for example, the forward electrical transmit path w 316a is similar to the dispersion loss along the second electrical path, for example, the forward electrical receive path y 314b. The host SerDes 304a may enable optimization of the applied pre-emphasis based on monitoring a channel inter-symbol interference (ISI) along at least one of the first electrical path, for example, the forward electrical transmit path w 316a and the second electrical path, for example, the forward electrical receive path y 314b. The host SerDes 304a may be adapted to optimize the applied pre-emphasis by receiving the monitored channel ISI.

Figure 4:
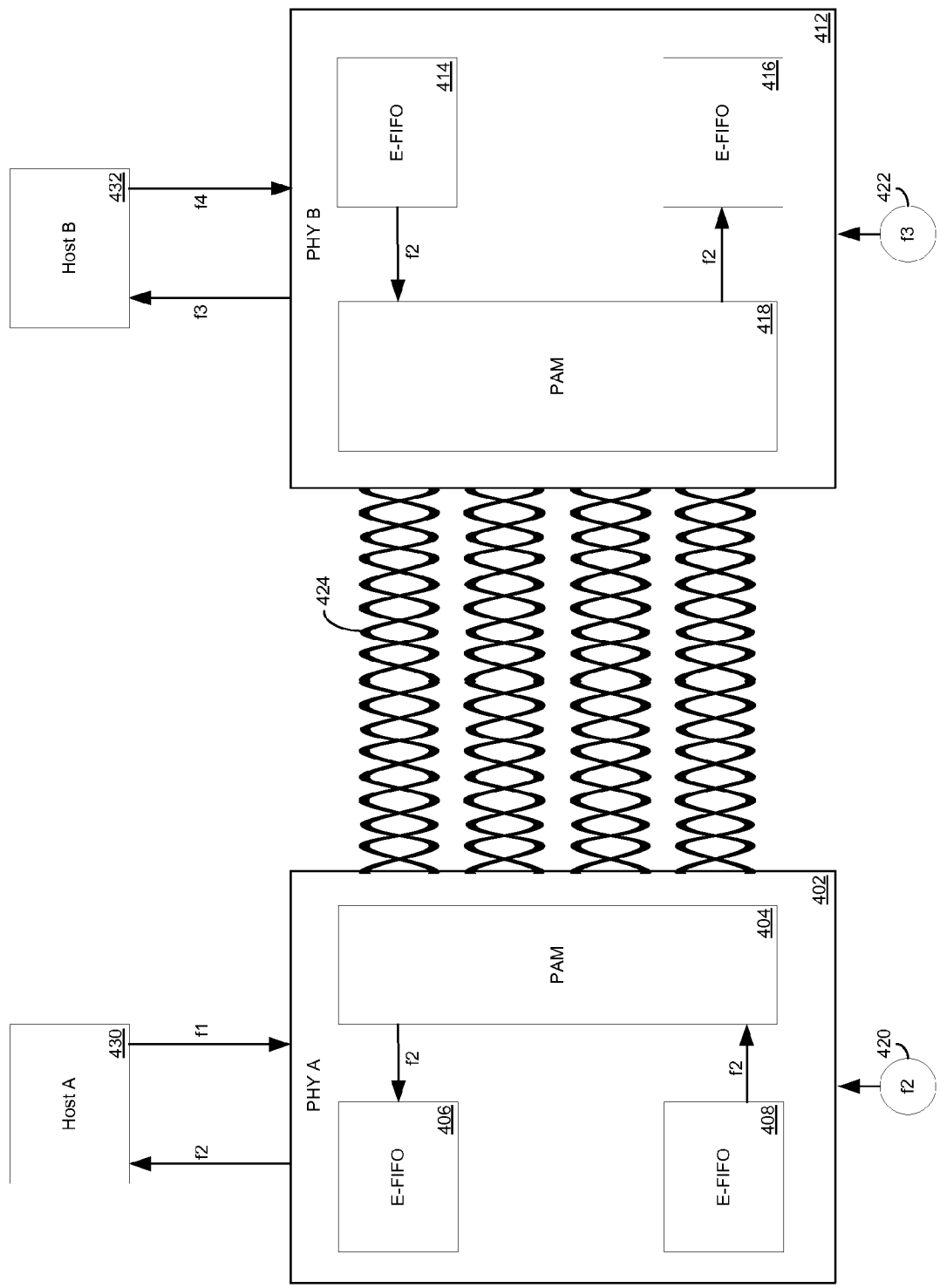
FIG. 4 is a block diagram for speed negotiation for twisted pair links using intelligent elastic first-in-first-out (E-FIFO) in fibre channel systems, in accordance with an embodiment of the invention.

FIG. 4 is a block diagram for speed negotiation for twisted pair links using intelligent elastic first-in-first-out (E-FIFO) in fibre channel systems, in accordance with an embodiment of the invention. Referring to FIG. 4, there is shown a host A 430, a host B 432, a PHY layer A 402, a PHY layer B 412, a twisted pair cable 424, a reference clock f2 420 and a recovered clock f3 422. The PHY layer A 202 comprises a pulse amplitude modulation (PAM) encoder/decoder 404, and a plurality of E-FIFO buffers 406 and 408. The PHY layer B 412 comprises a PAM encoder/decoder 418, and a plurality of E-FIFO buffers 414 and 416.

The fibre channel (FC) twisted pair PHY block 404 may comprise suitable logic, circuitry and/or code that may enable interfacing directly to a host 430. The fibre channel (FC) twisted pair PHY block 402 may operate at a variety of speeds, for example, 1 Gbps, 2 Gbps 4 Gbps, 8 Gbps, or 10 Gbps. The fibre channel (FC) twisted pair PHY block 402 may negotiate a common speed on the twisted pair cable 424 and operate with existing FC-2 layer solutions.

The physical layer (PHY) A 402 and the PHY layer B 412 may enable transmission of information over a physical medium connecting two devices. Fibre channel is a full duplex continuously transmitting technology. When there is no data to be transmitted, IDLE words and other ordered sets are transmitted by the upper layers. The PHY A 402 and PHY B 412 may receive from the upper layers, from example, MAC layers a continuous stream of data to transmit and conversely receive a stream of data from the twisted pair cable 424. A fibre channel data stream may comprise frames and ordered sets. In some cases, for example, when a particular fibre channel is an arbitrated loop, ordered sets may be utilized in an information stream, without frames.

The plurality of E-FIFO buffers 406, 408, 414, and 416 may comprise suitable logic, circuitry and/or code that may enable solving of potential clock skews between two or more connected PHYs 402 and 412, and may retime the data stream to be compliant with a FC-PI-2 jitter specification. The PAM encoder/decoder 404 and 418 may comprise suitable logic, circuitry and/or code that may enable conversion of each word on a Gigabit media independent interface (XGMII) to three 4 dimensional PAM-8 symbols, for example. The transmitted levels on each wire pair may be selected from a 4-dimensional 8 level signal constellation, for example.

In a fibre channel system, speed matching through E-FIFO at wire speed in FC-2 may be analogous to Ethernet MAC. One method of speed matching in fibre channel systems is somewhat similar to Ethernet, which is through insertion and deletion of IDLE words. Fibre channel links unlike Ethernet may also transmit a set of order sets, which may be transmitted for an indefinite period without any IDLE transmissions. An E-FIFO, for example, 406 or 408 not aware of these contiguous order sets may suffer from an overrun or an under run. The FC E-FIFO in addition to FC IDLE may keep track of an order set, for example, an alternate to IDLE ARB(ff), ARB(fb) for blocking ARB, ARB(src_alpha) for address assignment, no operating system (NOS), offline state (OLS), link reset (LR), link reset response (LRR), loop initialization primitive (LIP), loop port bypass (LPB), and loop port enable (LPE). The FC termination devices such as switches, HBAs, and disk drives may implement FC E-FIFO for speed matching, but the transmit and receive path operate synchronously.

In accordance with an embodiment of the invention, the receive clock wire between each MAC and PHY may be eliminated by providing an elasticity buffer (E-FIFO) in the PHY instead of in the MAC. In this configuration, the PHY A 402 and PHY B 412 are able to receive data using a clock recovered from the data, and then pass the data to the corresponding MACs using a global clock. In order to send and receive data to the MAC synchronous to the global clock, the PHY A 402 may pass the data through an elasticity FIFO 406 to handle any difference between the global clock rate and the clock rate at the packet source. The Ethernet specification (IEEE 802.3) calls for packet data to be referenced to a clock with a frequency tolerance of 100 ppm (0.01%). However, it is not uncommon to encounter Ethernet stations with clocks that have frequency errors up to 0.1%. The elasticity FIFO 406 and 408 in PHY A 402 may have sufficient capacity, and not saturate during the transmission of a packet. The PHY A 402 may receive data using recovered clocks, allowing the buffer to become approximately half full, and then pass data to the MAC using a global clock, which may have a different phase and frequency. In this way, the buffer may never overflow or becomes empty over the course of receiving and transmitting a packet of data, and no receive clock wire may be necessary in the MAC to PHY interface. The PHY A 402 and PHY B 412 may also enable implementation of speed matching without over clocking due to significant increase in complexity.

In an embodiment of the invention, the FC TP PHY A 402 and PHY B 412 may mimic the behavior of a delay bump on the wire to speed match the incoming data from host A 430 with FC-0 SerDes interface or host B 432 with FC-0 SerDes interface, while leveraging the basic mechanisms of FC protocol and order set rules. Unlike FC terminating devices such as a HBA or a disk drive, the intelligent E-FIFO TP PHY may operate in relay mode and synchronously.

The current implementation of FC links transmit and receive signal paths that operate asynchronously are not suitable for TP PHY operation. The intelligent E-FIFO 406 in FC TP PHY A 402 and E-FIFO 414 in PHY B 412 may output an E-FIFO pointer driven by reference clock f2 420 and recovered clock f3 422 respectively for complete jitter clean up. The intelligent E-FIFO, for example, 408 and 414 on the transmit path to the TP 424 may be capable of either operating from the reference clock f2 420 or from a derived clock f3 422 so that the transmit and receive of the TP link operate synchronously. Either TP PHY A 402 or TP PHY B 412 may assume master operation and the other PHY may assume a slave operation. The master PHY E-FIFO may operate from the reference clock f2 420 and the slave E-FIFO may operate from the recovered clock f3 422. The host A 430 may transmit data at frequency f1 and the host B 432 may transmit data at a frequency f4. The intelligent E-FIFO may insert or delete FC IDLE words and any of the following order set: an IDLE, an alternate to IDLE ARB(ff), ARB(fb) for blocking ARB, ARB(src_alpha) for address assignment, no operating system (NOS), offline state (OLS), link reset (LR), link reset response (LRR), loop initialization primitive (LIP), loop port bypass (LPB), and loop port enable (LPE).

Figure 5:
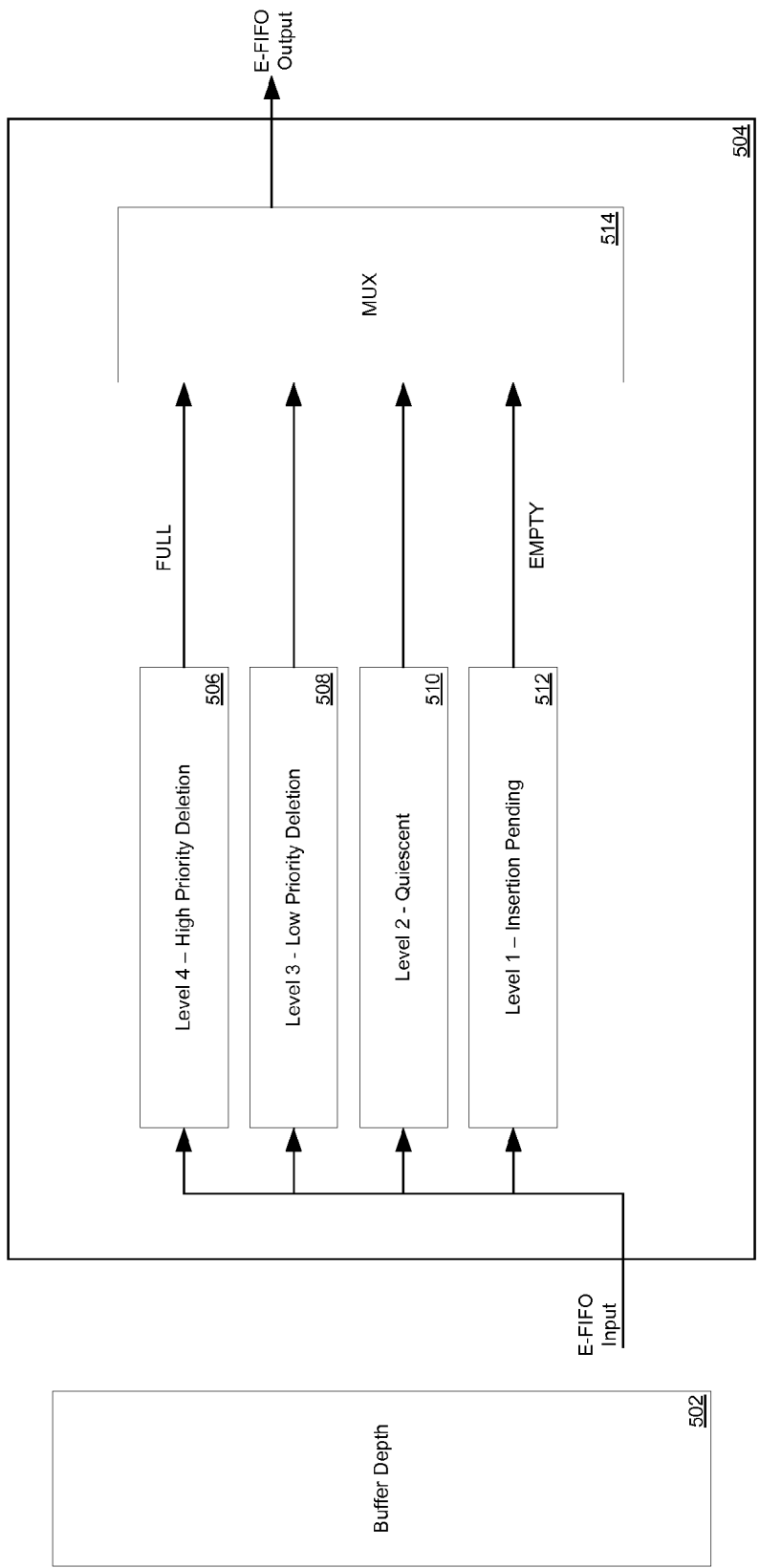
FIG. 5 is a block diagram illustrating exemplary elasticity FIFO insertion and deletion management, in accordance with an embodiment of the invention.

FIG. 5 is a block diagram illustrating exemplary elasticity FIFO insertion and deletion management, in accordance with an embodiment of the invention. Referring to FIG. 5, there is shown a buffer depth indicator 502, and an intelligent E-FIFO 504. The intelligent E-FIFO 504 may comprise a plurality of exemplary priority levels, level 1 512, level 2 510, level 3 508, and level 4 506, and a MUX 514.

The buffer depth indicator 502 may indicate the amount of information in the intelligent E-FIFO 504 and a corresponding level within the intelligent E-FIFO 504. The intelligent E-FIFO 504 may have several priority pointers one for each of the levels. The level 1 512 may indicate an insertion pending operation in the intelligent E-FIFO 504. The level 1 512 may indicate that the intelligent E-FIFO 504 is at or near an empty state. In level 1 512, a loop port (LPORT) may insert a current fill word (CFW) immediately after any fill word (FW). The level 2 510 may indicate a quiescent operation in the intelligent E-FIFO 504. In level 2 510, no action may be performed. The level 3 508 may indicate a low priority deletion operation in the intelligent E-FIFO 504. When the amount of information in the intelligent E-FIFO 504 reaches level 3, after four fill words with no intervening non-ordered set or data words, the loop port may delete the next fill word. If the current fill word changes to IDLE while a delete is pending, the loop port does not delete the first IDLE. After the FW is deleted the LPORT may either re-enter low priority state, namely level 3 508, and wait for four fill words before another delete, or enter the quiescent state, level 2 510 with no delete pending.

The level 4 506 may indicate a high priority deletion operation in the intelligent E-FIFO 504. The level 4 506 may indicate that the intelligent E-FIFO 504 is at or near a full state. When the amount of information in the intelligent E-FIFO 504 reaches level 3 508, after two fill words with no intervening non-ordered set or data words, the LPORT may delete the next fill word. If the current fill word changes to IDLE while a delete is pending, the LPORT may not delete the first IDLE. After the FW is deleted the LPORT shall either enter low priority state, or level 3 508 and wait for four fill words before another delete, or re-enter the high priority state, level 4 506 and wait for two fill words before another delete is pending on the buffer free space. The MUX 514 may comprise suitable logic, circuitry and/or code that may enable multiplexing each of the outputs of the various levels and generating an E-FIFO output. The E-FIFO input pointer may operate with a recovered clock pointer and the output pointer may operate from a VCO based on a clean reference clock with frequency deviation of +/−100 ppm, for example. In one aspect of the invention, in order to facilitate echo cancellation, the TP link transmit and receive signals may operate synchronously.

In an embodiment of the invention, a method and system for communicating data between at least two fibre channel hosts, for example, host A 430 and host B 432 on a twisted pair link 424 based on a negotiated common speed may comprise circuitry that enables determination of a priority level based on amount of data in an elastic buffer, for example, E-FIFO 406, 408, 414 or 416 communicatively coupled to at least one of the fibre channel host devices, host A 430 and host B 432. At least one elastic buffer, for example, E-FIFO 406, 408, 414 or 416 may be modified either by insertion or deletion of IDLE words or words from an order set based on the determined priority level. The data may be synchronously communicated between fibre channel host devices, FC host A 430 and FC host B 432 communicatively coupled via the twisted pair link 424 based on the modified elastic buffer, for example, E-FIFO 406, 408, 414 or 416. If the determined priority level indicates that the elastic buffer E-FIFO, for example, 406 is empty, the E-FIFO, for example, 406 may enable insertion of at least one word from an order set comprising: an IDLE, an alternate to IDLE ARB(ff), ARB (fb) for blocking ARB, ARB(src_alpha) for address assignment, no operating system (NOS), offline state (OLS), link reset (LR), link reset response (LRR), loop initialization primitive (LIP), loop port bypass (LPB), and loop port enable (LPE). The E-FIFO, for example, 406 may enable insertion of at least one current fill word after any fill word in the elastic buffer, if the determined priority level indicates that the elastic buffer E-FIFO, for example, 406 is empty, for example, level 1 512.

At least one E-FIFO, for example, 406 may enable deletion of a next fill word in the E-FIFO, for example, 406 if at least four fill words are inserted with no intervening data words, and if the determined priority level indicates a low priority deletion operation, for example, level 3 508. At least one E-FIFO, for example, 406 may disallow deletion of a first IDLE word if the determined priority level indicates a low priority deletion operation, for example, level 3 508 and if a current fill word changes to IDLE while a deletion operation is pending. At least one E-FIFO, for example, 406 may enable at least one of: re-entering the determined priority level that indicates a low priority deletion operation, for example, level 3 508 after waiting for at least four fill words before another deletion operation, and entering the determined priority level that indicates a quiescent operation, for example, level 2 510 with no deletion operation pending. At least one E-FIFO, for example, 406 may enable deletion of a next fill word if at least two fill words are inserted with no intervening data words, and if the determined priority level indicates a high priority deletion operation, for example, level 4 506. At least one E-FIFO, for example, 406 may disallow deletion of a first IDLE word if the determined priority level indicates a high priority deletion operation, for example, level 4 506 and if a current fill word changes to IDLE while a deletion operation is pending. At least one E-FIFO, for example, 406 may enable at least one of: entering the determined priority level that indicates a low priority deletion operation, for example, level 3 508 and waiting for at least four fill words before another deletion operation, and re-entering the determined priority level that indicates a high priority deletion operation, for example, level 4 506 and waiting for at least two fill words before another deletion operation.

The intelligent E-FIFO, for example, 408 and 414 on the transmit path to the TP 424 may be capable of either operating from the reference clock f2 420 or from a derived clock f3 422 so that the TP link transmit and receive operate synchronously. Either TP PHY A 402 or TP PHY B 412 may assume master operation and the other PHY may assume a slave operation. The master PHY E-FIFO may operate from the reference clock f2 420 and the slave E-FIFO may operate from the recovered clock f3 422.

Another embodiment of the invention may provide a machine-readable storage, having stored thereon, a computer program having at least one code section executable by a machine, thereby causing the machine to perform the steps as described above for speed negotiation for twisted pair links using intelligent elastic first-in-first-out (E-FIFO) in fibre channel systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An apparatus residing in a fibre channel host device, the fibre channel host device communicatively coupled to another fibre channel host device over a twisted pair link, the apparatus comprising:
   a physical layer (PHY) circuit operable, in a slave mode of operation, to receive data transmitted over the twisted pair link from a master PHY circuit in the another fibre channel host device, the PHY circuit comprising:
   a pulse amplitude modulation (PAM) encoder/decoder operable to convert the data transmitted over the twisted pair link to PAM symbols;
   clock recovery logic operable to recover a derived clock from the received data, wherein the derived clock determines a transmission rate between the PHY circuit and the master PHY circuit for the data received from the master PHY circuit; and
   a first elastic buffer operable to store the data received from the master PHY circuit via the PAM encoder/decoder and a second elastic buffer operable to store data received from the fibre channel host device for outgoing transmission to the master PHY circuit over the twisted pair link via the PAM encoder/decoder, wherein the transmission rate between the PAM encoder/decoder and the first elastic buffer is the same as the transmission rate between the PAM encoder/decoder and the second elastic buffer, while the transmission rate for data being transmitted from the PHY circuit and the fibre channel host device is different than the transmission rate being transmitted from the fibre channel host device to the PHY circuit.

2. The apparatus of claim 1, wherein the first elastic buffer is further operable to use the derived clock in storing the data received from the master PHY circuit.

3. The apparatus of claim 1, the PHY circuit further comprising a pointer into the first elastic buffer that is driven by the derived clock.

4. The apparatus of claim 1, the PHY circuit further comprising:
   an input pointer into the first elastic buffer that is driven by the derived clock; and
   an output pointer into the first elastic buffer that is driven from a reference clock.

5. The apparatus of claim 1, wherein the PHY circuit is further operable to pass, in a manner that is synchronous with respect to a global clock, the received data to a media access control (MAC) layer which is associated with the fibre channel host device and at which decoding of the received data is performed, the global clock being different from the derived clock.

6. The apparatus of claim 5, wherein the global clock is different from the derived clock in at least one of phase and frequency.

7. The apparatus of claim 5, wherein the apparatus is operable to receive without a receive clock wire between the MAC and the PHY circuit.

8. The apparatus of claim 1, wherein the PHY circuit is further operable to determine a priority level based at least in part on an amount of data in the first elastic buffer; and modify a contents of the first elastic buffer based at least in part on the priority level, wherein the modification occurs in response to the priority level indicating that the first elastic buffer is empty, and the modification includes at least inserting an IDLE word and at least one word from an order set comprising: an alternate to IDLE ARB(ff), ARB(fb) for blocking ARB, ARB(src_alpha) for address assignment, no operating system (NOS), offline state (OLS), link reset (LR), link reset response (LRR), loop initialization primitive (LIP), loop port bypass (LPB), and loop port enable (LPE).

9. In a fibre channel host device communicatively coupled to another fibre channel host device over twisted pair, a method comprising:
   receiving, by a physical layer (PHY) circuit, data transmitted from a master PHY circuit, the master PHY circuit residing in the another fibre channel host device;
   converting, by a pulse amplitude modulation (PAM) encoder/decoder, the data transmitted over the twisted pair link to PAM symbols
   recovering a derived clock from the received data, wherein the derived clock determines a transmission at which the received data is transmitted from the master PHY circuit; and
   storing, in a first elastic buffer, the data received from the master PHY circuit via the PAM encoder/decoder and storing, in a second elastic buffer, data received from the fibre channel host device for outgoing transmission to the master PHY circuit over the twisted pair link via the PAM encoder/decoder, wherein the transmission rate between the PAM encoder/decoder and the first elastic buffer is the same as the transmission rate between the PAM encoder/decoder and the second elastic buffer, while the transmission rate for data being transmitted from the PHY circuit and the fibre channel host device is different than the transmission rate being transmitted from the fibre channel host device to the PHY circuit.

10. The method of claim 9, wherein a global clock is different from the derived clock in at least one of phase and frequency.

11. The method of claim 9, wherein the storing uses the derived clock.

12. The method of claim 9, further comprising: maintaining a pointer into the first elastic buffer that is driven by the derived clock.

13. The method of claim 9, further comprising: providing an input pointer into the first elastic buffer that is driven by the derived clock; and providing an output pointer into the first elastic buffer that is driven from a reference clock.

14. A fibre channel system comprising:
   a fibre channel host device;
   another fibre channel host device communicatively coupled to the fibre channel device over a twisted pair link;
   a slave physical layer (PHY) circuit residing in the fibre channel host device; and
   a master PHY circuit residing in the another fibre channel host device, the master PHY circuit operable to transmit, using a reference clock, data from a transmit elastic buffer over the twisted pair link to the slave PHY circuit, and
   the slave PHY circuit including:
      a pulse amplitude modulation (PAM) encoder/decoder operable to convert the data transmitted over the twisted pair link to PAM symbols;
      clock recovery logic operable to recover a derived clock from the received data, wherein the derived clock determines a transmission rate between the PHY circuit and the master PHY circuit for the data received from the master PHY circuit; and
      a first elastic buffer operable to store the data received from the master PHY circuit via the PAM encoder/decoder and a second elastic buffer operable to store data received from the fibre channel host device for outgoing transmission to the master PHY circuit over the twisted pair link via the PAM encoder/decoder, wherein the transmission rate between the PAM encoder/decoder and the first elastic buffer is the same as the transmission rate between the PAM encoder/decoder and the second elastic buffer, while the transmission rate for data being transmitted from the PHY circuit and the fibre channel host device is different than the transmission rate being transmitted from the fibre channel host device to the PHY circuit.

15. The system of claim 14, wherein the slave PHY circuit further comprises an input pointer into the first elastic buffer, the input pointer driven by the derived clock, and wherein the master PHY circuit further comprises an output pointer into the transmit elastic buffer, the output pointer driven from the reference clock.

* * * * *